(12) United States Patent
Knudsen et al.

(10) Patent No.: US 12,516,601 B1
(45) Date of Patent: Jan. 6, 2026

(54) CASING COLLAR LOCATOR

(71) Applicant: North Sea Electronics, Laksevåg (NO)

(72) Inventors: Truls Kristian Knudsen, Nestun (NO); Richard Fyhn, Ulset (NO)

(73) Assignee: North Sea Electronics, Laksevåg (NO)

( * ) Notice: Subject to any disclaimer, the term of this patent is extended or adjusted under 35 U.S.C. 154(b) by 0 days.

(21) Appl. No.: 18/904,269

(22) Filed: Oct. 2, 2024

(51) Int. Cl.
*E21B 47/09* (2012.01)
*E21B 17/08* (2006.01)
*G01V 3/10* (2006.01)
*H03F 3/45* (2006.01)

(52) U.S. Cl.
CPC .............. *E21B 47/09* (2013.01); *E21B 17/08* (2013.01); *G01V 3/101* (2013.01); *H03F 3/45475* (2013.01)

(58) Field of Classification Search
CPC ........ E21B 17/08; E21B 47/092; E21B 47/09; G01V 3/26; G01V 3/28; G01V 3/24; G01V 3/30; G01V 3/10; G01V 5/04; G01V 1/40; G01B 11/002; G01B 11/026; G01B 21/045; G01B 21/18; G01B 11/02; G01B 7/06; G01B 5/08; G01B 7/003
See application file for complete search history.

(56) References Cited

U.S. PATENT DOCUMENTS

| | | | |
|---|---|---|---|
| 2,782,365 A * | 2/1957 | Castel | E21B 47/092 324/346 |
| 2,967,994 A | 1/1961 | Peterson | |
| 4,808,925 A | 2/1989 | Baird | |
| 5,617,031 A | 4/1997 | Tuttle | |
| 5,689,183 A * | 11/1997 | Kohama | G01N 27/9046 324/225 |
| 6,691,779 B1 | 2/2004 | Sezginer et al. | |
| 6,693,553 B1 | 2/2004 | Ciglenec et al. | |
| 12,031,417 B2 | 7/2024 | Eitschberger et al. | |
| 2002/0195247 A1 | 12/2002 | Ciglenec et al. | |
| 2008/0030189 A1 | 2/2008 | McCarty | |
| 2023/0025615 A1 * | 1/2023 | Zemla | E21B 47/09 |
| 2024/0141778 A1 | 5/2024 | Crane et al. | |

OTHER PUBLICATIONS

Vincent, R. P. et al., "Well Flowmeter for Logging Producing Ability of Gas Sands," New York Meeting, Mar. 1947.

* cited by examiner

*Primary Examiner* — Tara Schimpf
*Assistant Examiner* — Lamia Quaim
(74) *Attorney, Agent, or Firm* — Alix, Yale & Ristas, LLP

(57) ABSTRACT

A casing collar locator, comprising two substantially identical inductor coils attached to a common stem with a fixed separation wherein the inductor coils generate substantially identical electromagnetic fields when an alternating current of substantially equal amplitude, such that a change in current in either the first inductor coil or the second inductor coil indicates a change in the magnetic or conductive materials in proximity to the electromagnetic field generated by the inductor coils, and methods for using such a casing collar locator.

19 Claims, 6 Drawing Sheets

CASING COLLAR LOCATOR

FIELD OF THE INVENTION

This invention relates to an apparatus and method for analyzing the position of conductive or magnetic features in a remote location. More particularly, this invention relates to an apparatus and method for locating underground conductive or magnetic features in a wellbore, including casing collars and other structural equipment in exploratory or production wells.

BACKGROUND TO THE INVENTION

A casing collar locator is a device used for locating the collars or joints connecting well casings in wellbores. Well casings are employed to structurally support a well after drilling, and the sections of well casings must be joined. Historically, this included an external casing collar made of ferromagnetic metal such as iron which could be located magnetically. Today, the casing collar may be avoided by using threaded well casings, reducing the amount of metal needed for construction. Additionally, non-ferromagnetic materials such as stainless steel may be employed to resist corrosion in the borehole.

Casing collar locators typically use powerful permanent magnets to detect ferromagnetic casing collars as they distort the magnetic field. It is also possible to use a permanent magnet to detect non-magnetic but conductive material such as stainless steel and copper using inductive dampening, but such the signal from such detection is dependent on the velocity of the permanent magnet past the conductive material.

U.S. Pat. No. 2,962,994 describes a logging apparatus adapted to be moved through a borehole for locating the joints between sections of steel casing, comprising a permanent magnet and substantially identical armatures disposed in magnetic contact with each pole of the magnet. Each armature has a magnetically soft core with a face in contact with the magnet means. and a magnetically soft pole spaced from said the magnet, and coils on the armatures, connecting the coils differentially to provide for the induction of net voltage only when a casing portion is magnetically asymmetrical with respect to the armatures. Recording means for operatively recording a voltage as a function of the depth of the tool in the borehole.

U.S. Pat. No. 4,808,925 describes a casing collar locator for use with casing having flush joint collars, a detection system with a tool body of nonmagnetic material and enclosing three abutting, axial aligned permanent magnets. Opposing poles are in close contact. The fields from the first and third magnets forming a magnetic field from the second, central magnet which is widely radially directed out into the casing metal. Detection coils spaced along the tool body detect signals induced by variations in magnetic reluctance as the tool moves through the cased well.

SUMMARY OF THE INVENTION

In a first aspect, the invention relates to a casing collar locator comprising a first inductor coil, a second inductor coil, at least one signal generator, a bridge circuit comprising said first inductor coil, said second inductor coil, and a resistor branch comprising a first and second resistor. The bridge circuit is arranged such that the at least one signal generator generates an alternating current through said first inductor coil that is of substantially equal amplitude and opposite phase to an alternating of current through said the second inductor coil. A test voltage measured at an inductor node connecting the first inductor coil and the second inductor coil is compared to a reference voltage measured on a resistor node of the resistor branch, such that comparing the test voltage and the reference voltage yields a signal indicative of the proximity of conductive or magnetic material to either the first inductor coil or second inductor coil.

In a second aspect, the invention relates to a casing collar locator comprising a first inductor coil, a second inductor coil which is substantially identical to said first inductor coil, said first inductor coil and second inductor coil attached to a common stem with a fixed separation,
  wherein the first inductor coil and second inductor coil generate substantially identical electromagnetic fields when an alternating current of substantially equal amplitude is applied to the first inductor coil and second inductor coil such that a change in current in either the first inductor coil or the second inductor coil indicates a change in the magnetic or conductive materials in proximity to the electromagnetic field generated by the first inductor coil or the second inductor coil.

In a third aspect, the invention relates to methods for using said casing collar locator to detect magnetic or conductive material in or outside a casing.

DETAILED DESCRIPTION OF THE INVENTION

Figure 1:
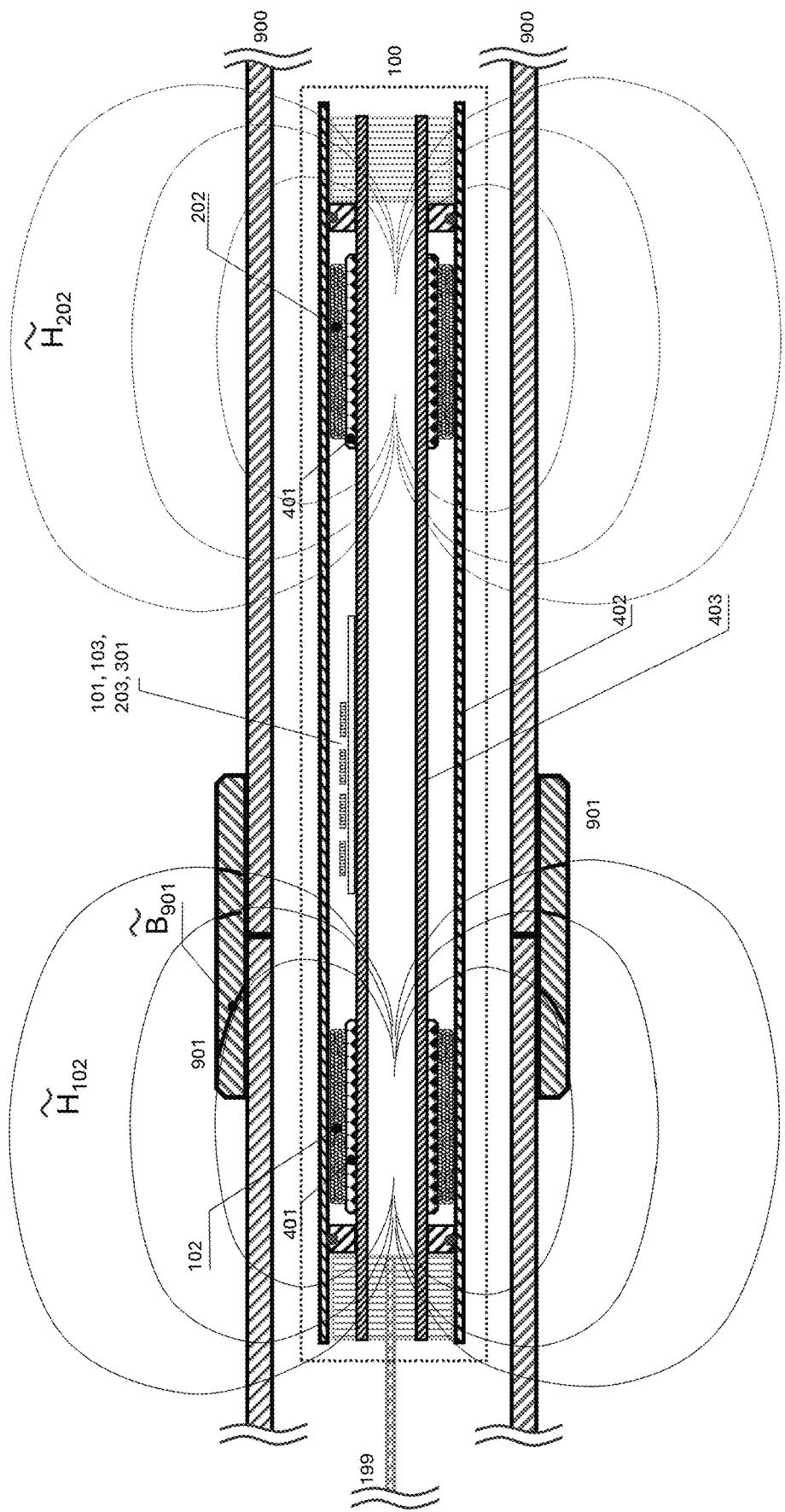
FIG. 1 illustrates a casing collar locator of the invention tool with two concentric coils on stem and electronic card, in housing arranged in a joined casing with casing collar. Magnetic fields are generated by the two inductor coils with cores.

A new casing collar locator device has been found to be of particular utility in wellbore measurement and analysis.
Inductor Coils The casing collar locator of the present invention comprises a first inductor coil and a second inductor coil. An inductor coil (also called a coil, choke, or reactor) is a passive two-terminal electrical component that stores energy in a magnetic field when electric current flows through the inductor coil. Inductor coils typically comprise of a conductive wire wound into a coil, the shape and qualities of such coil being variable to produce inductor coils of various qualities known to those of ordinary skill in the art. For the generation of electromagnetic fields in casing collar locators of the present invention, the rod-core inductors are preferably used to create electromagnetic fields for analysis of conductive or magnetic material in the down-well environment. Most preferably, the rod-core comprises a cylindrical ferromagnetic rod core. While the hollow cylindrical ferromagnetic rod-core may be toroidal in that a cylinder is a toroid, the inductor coils of the present invention are not "toroidal inductors" because the conductive wire is not wound toroidally. Due to the symmetry of "toroidal inductors", little magnetic flux escapes the core and thus the range of the generated electromagnetic field would be limited. Hence, "toroidal inductors" that have toroidal winding are not suitable for use in the casing collar locators of the present invention. Preferably, the cylindrical ferromagnetic rod core of the first inductor coil shares an axis with the cylindrical ferromagnetic rod core of the second inductor. In some embodiments the core of the inductor coils comprises a through bore so as for enabling passage of fluids or wires.

Inductor coils may be made or selected by those of ordinary skill in the art to suit the dimensions and qualities fitting the intended use of the inductor coil. For the inductor coils in a casing collar locator, this means inductor coils and electrical components suited for down-well activity. To fit well-bores of common usage in industry, such inductor coils may typically vary from 20 mm to 60 mm in diameter. Larger or smaller diameters of inductor coils may be suitable for well-bores of larger or smaller diameters. The electrical components used in the casing collar locator should also be suitable for down-well activity, which may include high temperatures and mechanical vibrations.

The first inductor coil and second inductor coil may be closely matched to ensure that equal signals generate similar electromagnetic fields. In a preferred embodiment, the first inductor coil and second inductor coil of the casing collar locator may be substantially identical inductor coils. The electromagnetic alternating field generated by a signal or current induced in the first inductor coils may be substantially identical to the electromagnetic alternating field generated by the same signal or current induced in the second inductor coil.

The first inductor coil and second inductor coil may have substantially identical dimensions, material properties and/or manufacturing configurations. The first inductor coil and the second inductor coil may be formed of substantially identical conductive wire which may be of substantially identical diameter. The first inductor coil and second inductor coil may have a substantially identical number of turns in the coil wire, a substantially identical diameter and axial length, and/or a substantially identical mass.

The first inductor coil and second inductor coil may be air core inductor coils but are preferably include a core formed from a magnetic material of high magnetic permeability, including ferromagnetic core such as pressed ferrite powder or cold-rolled non grain-orientated ("CRNGO") steel. In the preferred embodiment, the first inductor coil and second inductor coil have substantially identical core materials and substantially identical core properties.

Common Stem

The first inductor coil and second inductor coil are connected to a common stem. The common stem may be rigidly connected to the chassis of the casing collar locator or, alternatively, may comprise the chassis of the casing collar locator. The common stem may be hollow to allow for center flow passage. The first inductor coil, second inductor coil, and common stem may all be enveloped by an outer housing. The common stem and outer housing may comprise a non-magnetic, non-conductive material.

The first inductor coil and second inductor coil are separated on the common stem by a fixed distance. Preferably, the cylindrical ferromagnetic rod cores of the first inductor coil and second inductor coil share a common axis with the common stem. The conductive wire of the first inductor coil and second inductor coil is preferably wound axially around a common axis shared by the first inductor coil, the second inductor coil, and the common stem.

Bridge Circuit

The first inductor coil and second inductor coil are connected in a bridge circuit with a first resistor, a second resistor, at least one signal generator, and a differential amplifier. The bridge circuit is arranged to detect variation in the electromagnetic fields such as the electromagnetic field ($B_{901}$) created by the proximity of conductive or magnetic materials such as the casing collar relative to the first inductor coil and/or the second inductor coil. Electromagnetic fields are generated in the first inductor coil and second inductor coil by the current flowing through the first inductor coil and second inductor coil, and the current is generated by at least one signal generator.

The first branch (the "inductor branch") of the bridge circuit comprises the first inductor coil and second inductor coil connected in series with an inductor node between the first inductor coil and second inductor coil, said inductor node connected to the first input terminal (the "inductor input") to the differential amplifier.

The second branch (the "resistor branch") of the bridge circuit comprises a first resistor and a second resistor connected in a series with a resistor node between the first resistor and second resistor, said resistor node connected to the second input terminal (the "resistor input") to the differential amplifier.

The first inductor coil and first resistor are connected by a node (the "first signal node") to the source of the first signal. The second inductor coil and second resistor are connected by a node (the "second signal node") to the source of the second signal.

The bridge circuit may be balanced by methods known to those skilled in the art. Specifically, the impedance of the first inductor coil ($Z_{L1}$), the second inductor coil ($Z_{L2}$), the first resistor ($Z_{R1}$), and second resistor ($Z_{R2}$) may be measured and selected so that their values are substantially equal in the absence of outside electromagnetic influences. The impedance of a resistor is equal to the resistance of that resistor (i.e., $Z_R=R_R$), while the impedance of an inductor is dependent on the inductance of the inductor and frequency of the alternating current (i.e., $Z_L=j\omega L_L$). Alternatively, the ratio of the impedance of the first inductor coil and the impedance of the second inductor coil ($Z_{L1}/Z_{L2}$) is matched to the ratio of the resistance on the resistance branch of the bridge circuit ($R_{R1}/R_{R2}$).

When the bridge circuit has been balanced, the voltage from the inductor node to the inductor input of the differential amplifier may be compared to the voltage from the resistor node to the resistor input of the differential amplifier. If one of the electromagnetic fields created by the first inductor coil or second inductor coil is influenced by external conductive or magnetic materials, the current across that inductor coil will be impeded, which will in turn create an increased differential voltage between the inductor input and resistor input to the differential amplifier, said differential voltage having both a magnitude and phase value. The magnitude of said differential voltage may then be used to infer the presence of variations in conductive or magnetically permeable materials in the proximity of an inductor coil. The phase of said differential voltage may be used to infer which of the inductor coils is being influenced by variations in conductive or magnetic materials in its proximity.

Signal Generation

The at least one signal generator is a device capable of generating electrical signals with set properties of amplitude, frequency, and wave shape. The casing collar locators of the present invention measure the electromagnetic effect of the surrounding well materials on electromagnetic fields created by the first and second inductor coils. The electromagnetic fields of the inductor coils may be created by alternating current (AC) signals emitted by the at least one signal generator to create sine-like (or pseudo-sine) currents in the inductors.

The pseudo-sine current generated in the first inductor coil should be 180-degrees out-of-phase (antiphase) compared to the pseudo-sine current generated in the second inductor coil, such that in the absence of external effects or influence the current across the first inductor coil and second inductor coil will be substantially equal in electrical current but opposite in phase.

The equal-but-opposite electrical currents across substantially identical inductor cores generate substantially identical magnetic fields, which may be affected or influenced by magnetic or conductive materials in the proximity of the inductor coil. For example, if the first inductor coil is placed near a conductive material in the well-bore or otherwise in the proximity of the first inductor coil, the current across the first inductor coil will induce a first electromagnetic field which itself may generate an eddy current (also called Foucault's current) in the external conductive material. This eddy current may generate its own induced magnetic field, which opposes a change in the electromagnetic field of the first inductor coil in accordance with Lenz's law, thus affecting the current across the first inductor coil.

Because the current across the first inductor coil has been weakened by the effects of conductive materials closer to the first inductor coil, it is no longer equal-and-opposite to the current across the second inductor coil.

Accordingly, a voltage is created by the difference in current across the first inductor coil and second inductor coil at the inductor node connecting the first and second inductor coil. This inductor node is connected to the differential amplifier, and its signal is subsequently amplified to the extent it differs from the reference signal.

When the casing collar locator travels farther down the well such that the second inductor coil is in proximity with the conductive material, the conductive material will affect the current of the second inductor coil in a substantially identical manner. The signal created by this will create a signal of substantially identical amplitude but opposite phase to that created by the first inductor coil. Because the first inductor coil and second inductor coil are a fixed distance apart on the common stem, the distance travelled by the casing collar locator can be inferred from first inductor coil and second inductor coil passing the same stationary conductive material. In this way, significant conductive features such as casing collars may be counted and located, and the position of the casing collar locator may be ascertained.

Casing collar locators of the prior art have used various measurements of electromagnetic fields and corresponding eddy signals to measure the thickness, continuity, and surface qualities of down-well casing materials. When such casing collar locators use the motion of permanent magnets past conductive materials to measure the eddy-current induced resistance, the signal generated is dependent on the speed of casing collar locator past the stationary conductive materials. When such casing collar locators use driven magnets to measure changes in magnetic reluctance between sensor coils, generally magnetic materials such as iron, nickel, and cobalt may be detected, while conductive but non-magnetic materials such as copper, aluminum, and stainless steel are less easily detected. The present invention, however, uses the electromagnetic fields generated by the 180-degree offset pseudo-sine currents of the inductor coils themselves to detect magnetic and non-magnetic conductive materials and does so independently of the speed of the casing collar locator, such that the signal strength is the same even with a static logging tool in the casing.

Here "180-degree offset" means that compared to a first periodic waveform, a second periodic waveform is out of phase such that the current generated by the second periodic waveform is equal-but-opposite to the current generated by the first periodic waveform. Whether each waveform signal is sinusoidal or non-sinusoidal (e.g., rectangular, square, sawtooth, triangular, etc.), "180-degree offset" relates to half-way through the period of the periodic waveform, and may also be known as an antiphase or complimentary. The 180-degree offset pseudo-sine currents in the first inductor coil and second inductor coil may be generated by methods known by those of skill in the art.

In one embodiment, a first signal generator is connected to the first inductor coil and a second signal generator is connected to the second signal generator is connected to the second inductor coil, the second signal generator arranged to produce a signal that is substantially identical to the signal produced by the first signal generator but with a 180-degree offset in phase, such that the first signal and second signal are substantially equal in amplitude.

In another embodiment, a single signal generator is connected to a bridge amplifier configured to produce a first amplified signal and a second amplified signal of equal amplitude but opposite phase.

In another embodiment, the second signal generator is a component connected to the first signal generator, such as a signal inverter or a delay filter, such that when the first signal is applied to said component the resultant second signal is a 180-degree offset signal that is of substantially equal amplitude but opposite phase to the first signal.

In yet another embodiment, the first signal and second signal are generated by the same signal generator to create two signals of substantially equal amplitude but opposite phase, such as a push-pull output.

In some embodiments, the first and second signals are generated using pulse-width modulation (PWM) of signals is also known as pulse-duration modulation (PDM) or pulse-length modulation (PLM). PWM uses rectangular waveforms of equal voltage but variable time-duration (duty cycle) to generate pseudo-sines of current in the inductor coils. The pseudo-sine current waveform in such embodiments is the integral of the pulse-width modulated voltage signal generated by the signal generators. The PWM signal may be generated by digital or analog components by methods known to those of skill in the art.

In some embodiments, the first signal and second signal produce currents across the first inductor coil and second inductor coil that are substantially equal in current but opposite in phase.

In some embodiments, the electromagnetic fields generated by the first inductor coil and second inductor coil are axially aligned such that the north and south pole of each electromagnetic field points in the same direction. In other embodiments, the electromagnetic fields generated by the first inductor coil and second inductor coil are aligned such that the north and south pole of the electromagnetic field generated by the first inductor coil are aligned opposite to the north and south pole of the electromagnetic field generated by the second inductor coil.

In other embodiments, the relative orientation of the two electromagnetic fields is variable, as the relative polarity of electromagnetic field in one inductor coil may be inverted by reversing the flow of current through the inductor coil. At least one inductor coil may be arranged such that an alternative circuit reverses the current flow through that inductor coil. In this way, the first inductor coil and second inductor coil would remain 180-degree offset (antiphase) with regards to the current flowing through the inductor branch of the bridge circuit, but the relative polarity of the electromagnetic fields generated by the first inductor coil and second inductor coil may be changed.

In preferred embodiments of invention, the pseudo-sine of current generated through the inductor coils has a frequency of between 30 Hz and 3000 Hz. In some embodiments, the frequency of the pseudo-sine of current generated through the inductor coils has a frequency of about 500 Hz. The frequency of the pseudo-sine of current generated through the inductor coils may be derivative of the voltages generated by the signal generator.

The signal generator or signal generators may produce sequences of voltages that are periodic or quasiperiodic to create pseudo-sine waveform of current through the first inductor coil and second inductor coil. These voltage sequences are produced at higher frequencies than the resultant pseudo-sines, and thus filters may be used to limit the signal to that relevant to the function of the casing collar locator. Accordingly, the bridge circuit may comprise low-pass filters or band-pass filters between the inductor node and the inductor input or between the resistor node and resistor input. Alternatively, the signal produced by the differential amplifier may be modulated by a filter to separate the desired signal from higher frequency waveforms. Other methods of signal filtration and noise reduction may be employed in methods understood by those of ordinary skill in the art.

Resistors

The first resistor and second resistor of the bridge circuit are arranged to create a bridge circuit with the first inductor coil and second inductor coil. While the impedance of the first inductor coil and second inductor coil may be affected by external conductive or magnetic materials, the impedance of the first resistor and second resistor is equal to their resistance, which will not be affected by the proximity of external conductive or magnetic materials. Accordingly, the resistor branch of the bridge circuit provides a reference voltage to the differential amplifier which is measured against the voltage provided by the inductor branch of the bridge circuit.

While the resistance of the first resistor and second resistor should not be affected by the electromagnetic qualities of materials in the well-bore, the resistance of the resistors may be affected by other factors, such as operating temperature. Accordingly, preferred embodiments of the invention may include a variable resistor or a variable resistor and fixed resistor in parallel. Variable resistors may include potentiometers, digital variable resistors, analog variable resistors, or other variable resistors known to those of skill in the art. In preferred embodiments, the variable resistors may be adjusted remotely so that the casing collar locator can be calibrated or adjusted while in operation.

Where the frequency of the pseudo-sine of current flowing through the inductor coils is variable, variable resistors may be used to balance the bridge circuit as the impedance of the inductor coils will change with frequency of the pseudo-sine current. This is because the impedance of a resistor is equal to the resistance of that resistor (i.e., $Z_R=R_R$), while the impedance of an inductor is dependent on the inductance of the inductor and frequency of the alternating current (i.e., $Z_L=j\omega L_L$). Accordingly, digital potentiometers may be used to remotely adjust the resistors during down-well operations if the frequency of the pseudo-sine is adjusted during down-well operations.

Resistors may be combined, arranged, or adjusted in ways known by those of skill in the art to create predictable resultant effective resistance. Components with a known resistance may also act as resistors. Accordingly, the first resistor and second resistor may comprise combinations of resistors or other components arranged in parallel or in series to generate an effective resistance on the resistor branch of the bridge circuit.

Differential Amplifier

As noted above, the two branches of the bridge circuit are connected to the two input terminals of the differential amplifier. The inductor node between the first inductor coil and second inductor coil is connected to the first input terminal (the "inductor input") to the differential amplifier, and the resistor node between the first resistor and second resistor is connected to the second input terminal (the "resistor input") to the differential amplifier. The resistor node provides a reference voltage, indicative of the signal produced by the signal generator but uninfluenced by external conductive or magnetic materials. The inductor node provides a test voltage, which is substantially identical to the reference voltage when the inductors are not in the presence of external conductive or magnetic materials.

Thus, when the first inductor coil and second inductor coil are not influenced by external conductive or magnetic materials, the reference voltage and test voltage will be substantially identical, and the differential amplifier will have negligible differential signal to amplify. If the first inductor coil is influenced by the presence of external conductive or magnetic materials, the test voltage will differ from the reference voltage, and the difference in signal will be amplified by the differential amplifier. Similarly, if the second inductor coil is influence by the same external conductive or magnetic materials, the test voltage will differ from the reference voltage in a similar manner but opposite. This may also relate to phase. Thus, if the output from the differential amplifier is analyzed to note similar signal differences of opposite voltage and/or phase passed by the first inductor coil and second inductor coil, the direction and speed of the casing collar locator can be inferred. The phase output of the differential amplifier can be calibrated to determine which inductor coil has the in-phase signal and which inductor coil has the 180—offset (antiphase) signal by methods known to those of skill in the art.

The differential amplifier and bridge circuit as described provide a signal for analysis with an amplitude and phase component. While it is preferred to include these components physically on the casing collar locator so that electrical and environmental variations are shared by all components, the components of the bridge circuit may be electrically separated but virtually connected to the same effect. "Virtual" here, refers to software solutions which replicate the functionality of a hardware component. For example, if the resistor node is connected to a first digital voltmeter, and the inductor node is connected to a second digital voltmeter, the signals can be digitally compared and the difference amplified on a software-based virtual differential amplifier which is not located down-well. Similarly, the first inductor coil and first resistor can create an independent circuit from the second inductor coil and second resistor, but the two circuits may be virtually bridged by comparing differences in voltage along the circuits. These virtual circuits provide increased complexity, difficulty in signal processing, and lower accuracy in casing collar locator functionality when compared to preferred embodiments of the claimed casing collar locator.

Signal Processing

The signal produced by the differential amplifier may be modified, processed, converted, or otherwise transformed by methods known to those of skill in the art. For example, to isolate the portion of the signal which relates to the pseudo-sine of current through the inductor coils and remove background noise, a high-pass, low-pass, or band-pass filter may be used. Such filters may be physically located on the casing collar locator or employed in software-based solutions at the site of signal analysis.

Additionally, an analog-to-digital converter (ADC) may be used to convert the electrical signal produced by the differential amplifier to a digital signal which is then transferred to the site of signal analysis. Both analog and digital signals may be sent from the casing collar locator location down-well to the site of signal analysis on the surface using methods known to those of skill in the art. Specifically, both analog and digital signals may be sent via wireline to an operator on the surface. However, digital signals may be more reliably transmitted via wireline with lower power requirements. Digital signals may also be preprocessed by onboard software in the casing collar locator before transmittal to the site of signal analysis.

Signals from the casing collar locator may be directly transmitted to a signal processing site on the surface in real-time via wireline or may be stored on the casing collar locator tool stem for later retrieval if real-time transmission if the casing collar locator is being operated on "slickline" (non-conducting cable). Slickline operation requires that the casing collar locator records its data simultaneously with, for example, a full production logging suite, but these data are not available until the data has been retrieved at the surface. Data from the casing collar locator may be stored, transmitted, or retrieved by methods known to those skilled in the art.

The signal data from the casing collar locator may be analyzed at a site of signal analysis alone or in conjunction with data from other logging tools. The signal data from casing collar locators of the present invention differs from casing collar locator signal data from casing collar locators dependent on permanent magnets in that the signal created by an external conductive or magnetic element does not depend on the velocity of the casing collar locator device, and even work with zero speed relative to the casing. For casing collar locators using permanent magnets, the inductive resistance measured is dependent on the speed and strength of the magnet as it passes the conductive material. Thus, the same conductive material will provide different signals at different speeds of casing collar locators of the background art, and almost no discernable signal when the casing collar locator is moving slowly or stopped.

However, casing collar locators of the present invention can generate consistent signals for consistent proximities to external conductive or magnetic materials independent from the speed of the casing collar locator. This enables functionality that was not possible with casing collar locators of the prior art that use permanent magnets. First, the speed of the casing collar locator may be inferred by measuring the time it takes for two substantially identical signals of opposite phase to pass. The first signal generated by the first inductor coil passing the conductive or magnetic object is registered, followed by a second signal of substantially identical voltage but opposite phase generated by the second inductor coil passing the same conductive or magnetic object, implies that the casing collar locator has traversed the known distance between the first inductor coil and second inductor coil. This speed should be comparable to the speed registered on the speed counter wheel of the wireline.

Second, the ability to locate conductive or magnetic material while in motion, at low speeds, or when stopped allows for wireline operators of the casing collar locator of the present invention to locate down-well conductive or magnetic features with increased precision. Once a conductive or magnetic feature has been identified, the casing collar locator may be slowed down and find when the consistent signal associated with said conductive or magnetic feature passes the first inductor coil and the second inductor coil. This may be repeated with higher sensitivity or higher power, according to the variable frequency and current potentially generated by the casing collar locators of the present invention. In such a way, the conductive or magnetic feature may be more accurately mapped and the precise location of specific features or sub-features may be located in relation to the fixed length between the first inductor coil and second inductor coil. If other well-bore tools are employed on the tool string and the tool string is of a known and fixed length, the tool string can be accurately moved said known and fixed length down the well-bore to place the other well-bore tool in proximity to the conductive or magnetic feature in order to conduct an intervention operation with that other tool in the toolstring such as a perforation gun, a valve tool, etc.

In addition to these advantages, the use of two inductor coils rather than permanent magnets to generate intermittent and induced electromagnetic fields allows for increased functionality of the casing collar locator on a combined tool string. Because the inductor coils may comprise hollow cylindrical ferromagnetic cores, a flow path through the axis of the casing collar locator may allow for the passage of fluid or tool cable through the casing collar locator. Additionally, because the inductor coils may be switched off, the magnetic fields generated may also be switched off, unlike permanent magnets. Permanent magnets may collect ferromagnetic debris from the well-bore, affecting signal generation and potentially impeding functionality of the tool string. The electromagnetic fields generated by the inductor coils of the current invention are rapidly generated, zeroed, and inverted due to the pseudo-sine of current flowing through the inductor coils. Accordingly, they do not accumulate ferromagnetic debris, and if they did, the debris could be jettisoned by temporarily turning off the signal generator.

Accordingly, in one embodiment of the invention, the casing collar locator comprises a first inductor coil, a second inductor coil which is substantially identical to said first inductor coil, said first inductor coil and second inductor coil attached to a common stem with a fixed separation; wherein the first inductor coil and second inductor coil generate substantially identical electromagnetic fields when an alternating current of substantially equal amplitude is applied to the first inductor coil and second inductor coil, such that a change in current in either the first inductor coil or the second inductor coil indicates a change in the magnetic or conductive materials in proximity to the electromagnetic field generated by the first inductor coil or the second inductor coil.

In an another embodiment, the casing collar locator comprises a first inductor coil, a second inductor coil, at least one signal generator, a bridge circuit comprising said first inductor coil, said second inductor coil, and a resistor branch comprising one or more resistors; said bridge circuit arranged such that the at least one signal generator generates an alternating current through said first inductor coil that is of substantially equal amplitude and opposite phase to an alternating of current through said second inductor coil, wherein a test voltage measured at an inductor node connecting the first inductor coil and the second inductor coil is compared to a reference voltage measured on a resistor node of the resistor branch, such that comparing the test voltage and the reference voltage yields a signal indicative of the proximity of conductive or magnetic material to either the first inductor coil or second inductor coil.

In such embodiments, said test voltage and said reference voltage may be used as input to a differential amplifier. Additionally, the at least one signal generator may comprise a pulse-width modulated signal generator arranged for generating pseudo-sine waves of current in the first inductor coil and the second inductor coil. Said first inductor coil and the second inductor coil may be located on a common stem, wherein each inductor coil is axially wound with respect to said common stem. The first inductor coil or second inductor coil may further comprise a ferrite core. The first inductor coil and the second inductor coil may be closely matched such that an equal current through each inductor coil generates substantially identical electromagnetic fields. The first inductor coil and second inductor coil may also be substantially identical.

Furthermore, the at least one signal generator may be arranged for generating a first wave signal at a 180-degree phase difference from a second wave signal, such that when the first wave signal is passed through the first inductor coil and the second wave signal is passed through the second inductor coil, the first inductor coil and second inductor coil generate substantially identical electromagnetic fields in the absence of proximal conductive or magnetic materials or absence of contrasts of conductive or magnetic materials.

Embodiments of the invention may further comprise a casing collar locator wherein the resistive branch comprises a first resistor, a second resistor, and one or more potentiometers. The bridge circuit of the embodiments may comprise a first signal generator connected to said first inductor coil, a first resistor, and a first potentiometer; a second signal generator connected to said second inductor coil, a second resistor, and a second potentiometer; wherein said first inductor coil and said second inductor coil connect at an inductor node connected to a first input terminal of a differential amplifier; and said first and second resistors connect at a resistor node; and said first and second potentiometers connect at a potentiometer node; and said resistor node is connected to said potentiometer node, wherein said potentiometer node is further connected to a second input terminal of said differential amplifier wherein the test voltage and reference voltage are used as input to a differential amplifier. The casing collar locator may comprise a low pass filter connected to an output terminal from said differential amplifier, and an analog-to-digital converter connected to said low pass filter. The resistor branch may comprise at least one remotely adjustable variable resistor, such as a digital potentiometer.

In another aspect, the invention comprises a method of detecting materials such as casing collars, metallic patches in the casing, wire clamps, stage injection valves, etc., having contrasts of conductivity and/or magnetic permeability in or outside a borehole casing using the casing collar locator as described, said method comprising arranging said casing collar locator in a first axial position (P1) in said casing, measuring an amplitude and a phase of an output signal produced by the comparison of said test voltage to said reference voltage, said output signal being indicative of the proximity of said materials to the first inductor coil when the expected amplitude of signal through said first inductor coil is changed; said output signal being indicative of the proximity of conductive materials to the second inductor coil when the expected amplitude of signal through said second inductor coil is changed; wherein the change of current through either the first inductor coil or the second inductor coil may be inferred from the amplitude and/or phase of the test voltage. The proximity of a conductive object to the first inductor coil may also produce an output of similar amplitude but opposite phase when the conductive object is at a similar proximity to the second inductor coil.

Such methods may comprise arranging said casing collar locator in a casing, measuring the amplitude and phase of output signal produced by the comparison of the test signal to the reference signal, the output signal being indicative of an imbalance in the electromagnetic induction of conductive materials surrounding the first inductor coil and the second inductor coil. These methods may be used whether the casing collar is static, or whether the casing collar is moving.

FIG. 1 illustrates a cross-section of a casing collar locator 100 of the present invention being traversed by a within a well casing 900 while connected to the surface by a wireline 199. The casing collar locator 100 comprises a first inductor coil 102 and second inductor coil 202 connected to a common stem 403 and encased in a cylindrical tool housing 403. The casing collar locator 100 also comprises circuitry including at least one signal generator 101, a first resistor 103, second resistor 203, and a differential amplifier 301 arranged in the above described bridge circuits. The first inductor coil 102 and second inductor coil 202 are each cylindrically wound around a ferrite core 401 to be substantially identical and to produce substantially identical electromagnetic fields $H_{102}$, $H_{202}$. Here, the first inductor coil 102 is in proximity to a casing collar 901 of conductive or magnetically permeable material. The first inductor coil's electromagnetic field $H_{102}$ is affected by the induced field in the casing collar $B_{901}$, affected the current in the first inductor coil 102. The current in the second inductor coil 202 is not affected to the same degree, and this difference is converted to a signal by the differential amplifier 301. When the second inductor coil 202 is moved into a similar proximity to the casing collar 901, it will register an signal of substantially equal amplitude but opposite phase.

Figure 2:
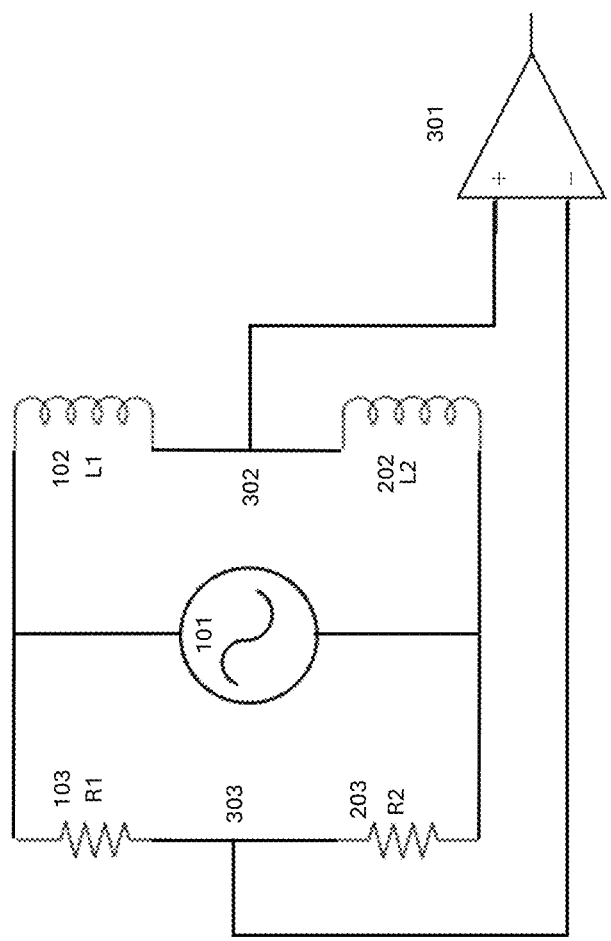
FIG. 2 is an electrical diagram of a first exemplary bridge circuit of casing collar locators of the invention.

FIG. 2 is an electrical diagram of a first exemplary bridge circuit of casing collar locators of the invention. At least one signal generator 101 generates an alternating current. The alternating current produces a pseudo-sine of current over the first inductor coil 102 generating a first electromagnetic field. The at least one signal generator 101 also produces a pseudo-sine of current of substantially equal amplitude but opposite phase over the second inductor coil 202 generating a second electromagnetic field substantially identical to the first electromagnetic field. The first inductor coil 102 and second inductor coil 202 are connected at an inductor node 302, which together comprise the inductor branch of the bridge circuit. The at least one signal generator 101 is also connected to the resistor branch of the bridge circuit, comprising a first resistor 103 and a second resistor 203 connected at a resistor node 303. The resistor node 303 is connected to one terminal of a differential amplifier 301. The inductor node 302 is connected to the other terminal of the differential amplifier 301. The test voltage from the inductor branch is compared to the reference voltage from the resistor branch to infer the proximity of conductive or magnetic materials to the first inductor coil 102 or second inductor coil 202.

Figure 3:
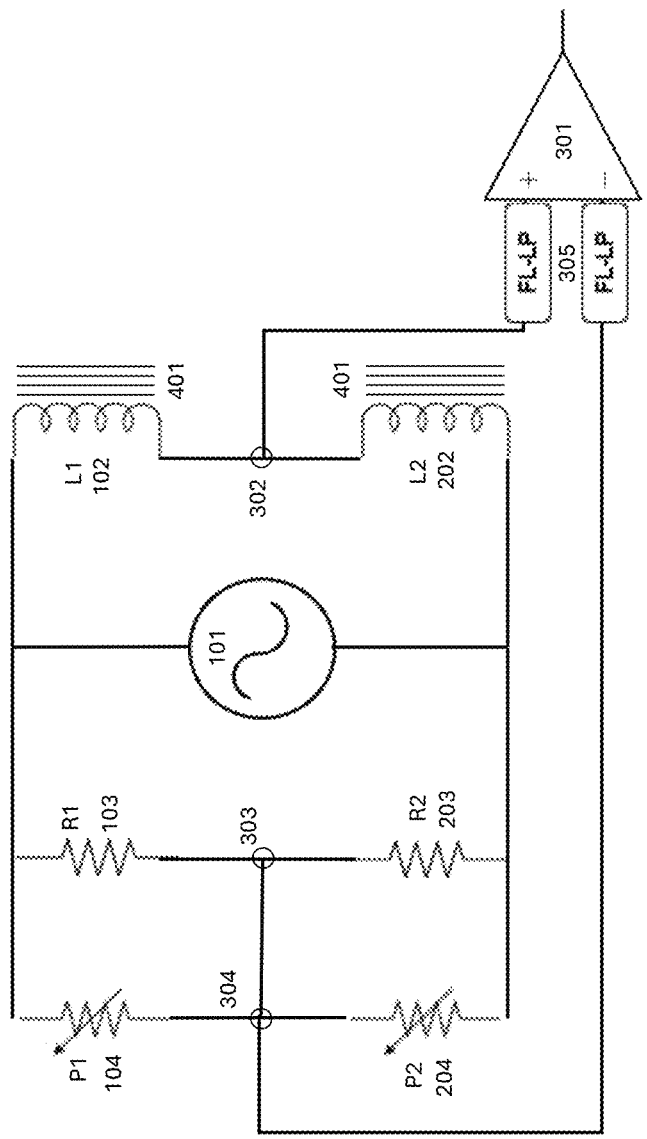
FIG. 3 is an electrical diagram of a second exemplary bridge circuit of casing collar locators of the invention.

FIG. 3 is an electrical diagram of a second exemplary bridge circuit of casing collar locators of the invention. In addition to the features described in FIG. 2, the second exemplary bridge circuit include features to improve the functionality of the casing collar locator in wellbore operations. The first inductor coil 102 and second inductor coil 202 further comprise ferrite cores 401, increasing the permeability and inductance of the inductors 102, 202. The resistive branch further comprises a first potentiometer 104 and second potentiometer 204 connected to a potentiometer node 304. The resistor node 303 is connected to the potentiometer node 304 before connecting to the differential amplifier 301. This allows the resistance of the resistor branch to be adjusted down well if the potentiometers 104, 204 are remotely adjustable. Low pass filters 305 are added between the resistor branch and inductor branch and the differential amplifier 301 to reduce high frequency signal noise such that only the the lower frequencies of the relevant pseudo-sine are compared by differential amplifier.

Figure 4:
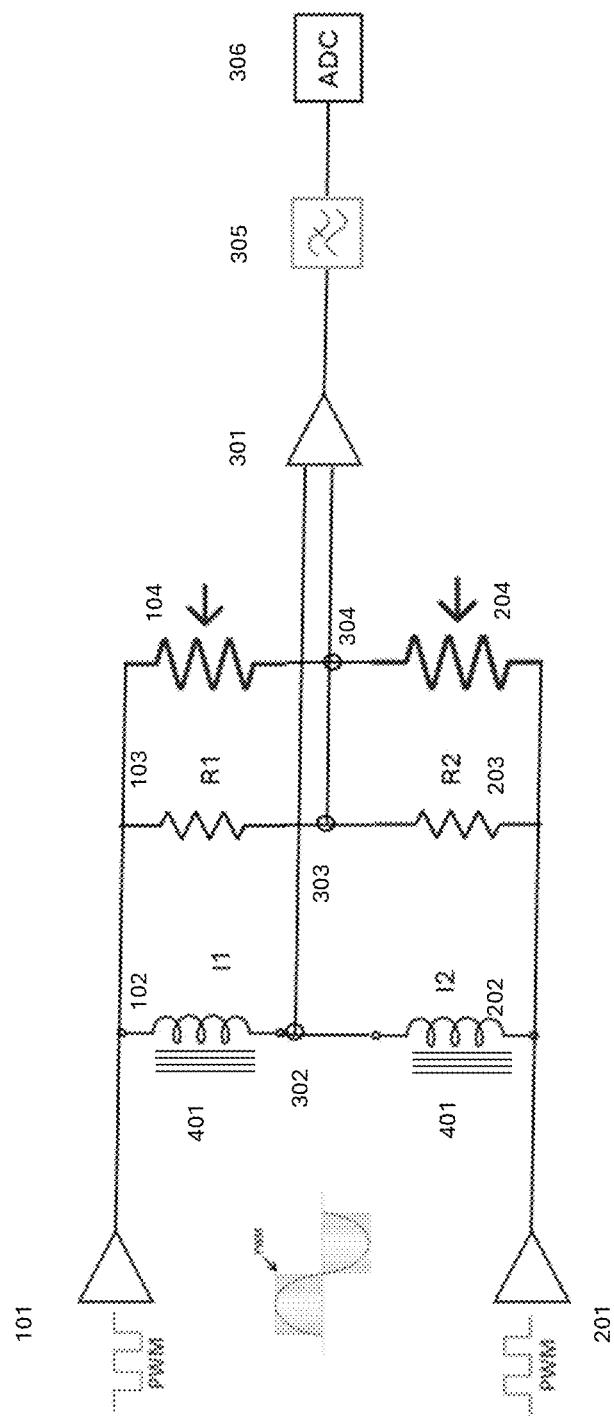
FIG. 4 is an electrical diagram of a third exemplary bridge circuit of casing collar locators of the invention.

FIG. 4 is an electrical diagram of a third exemplary bridge circuit of casing collar locators of the invention. Here, the at least one signal generator comprises a first signal generator 101 and a second signal generator 201, each producing pulse-width modulated (PWM) signals to create pseudo-sines of current across the first signal generator 101 and second signal generator 202, said pseudo-sines being of substantially equal amplitude but opposite phase. The bridge circuit is comparable to FIG. 3, except that the two low pass filters have been replaced by a single low pass filter 305 applied to the signal output from the differential amplifier 301. The filtered signal from the low pass filter 305 is then applied to an analog-to-digital converter 306 for further analysis.

Figure 5E:
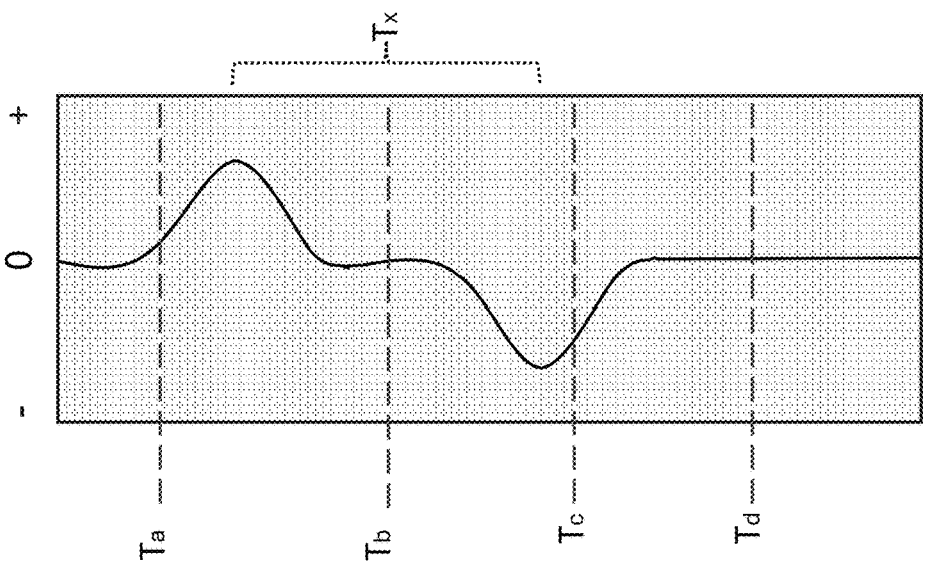
FIGS. 5A-5E is a series of diagrams of the casing collar locator in use.
Figure 5D:
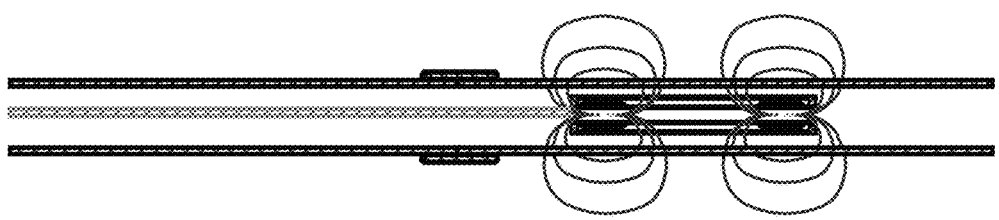
Figure 5C:
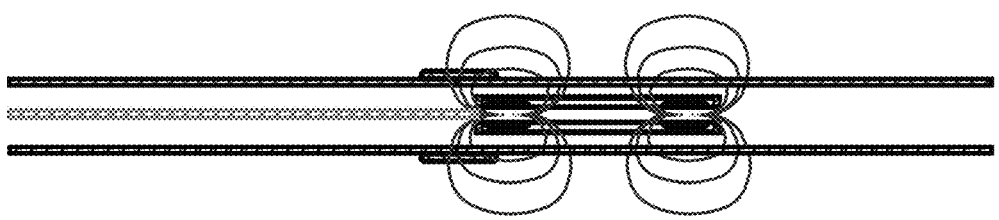
Figure 5B:
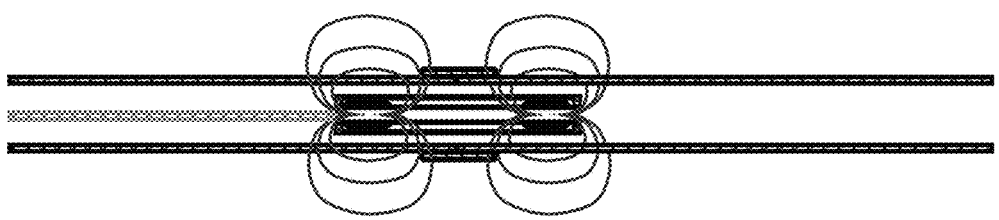
Figure 5A:
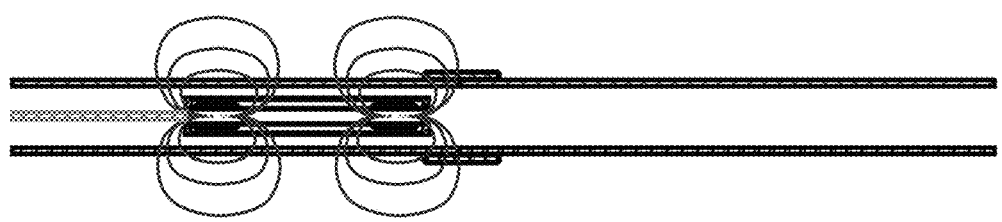

FIGS. 5A-5D illustrate a casing collar locator of the invention in operation as it passes a non-ferromagnetic casing collar in the well hole. FIG. 5E is an illustrative processed signal with voltage and phase component. In FIG. 5A, as the casing collar locator begins to reach the casing collar, the first inductor coil's electromagnetic field is affected by the conductive material in the non-ferromagnetic casing collar, reducing its current and registering a differential voltage at Ta in FIG. 5E. In FIG. 5B, as the first inductor coil's electromagnetic field has passed the casing collar and the casing collar is equally between both inductor coils, the current of each inductor coil is equally affected, registering a near-zero differential voltage at Tb in FIG. 5E. In FIG. 5C, the casing collar locator is departing the casing collar, the second inductor coil's electromagnetic field is affected by the conductive material in the non-ferromagnetic casing collar, reducing its current and registering a differential voltage at Tc in FIG. 5E, which is of substantially equal amplitude but opposite phase to the signal created by the first inductor coil's passage. Finally, when the casing collar locator has fully passed the casing collar locator and in the absence of conductive or magnetic contrast in the wellbore, the bridge circuit is again balanced and the differential voltage is again near-zero at Ta in FIG. 5E. Tx in FIG. 5E represents the difference in time between the first signal peak and the second signal peak of substantially equal amplitude but opposite phase, which represents the time it took for the casing collar locator to traverse the fixed distance between the first inductor coil and second inductor coil as each passed the fixed casing collar.

Figure 6E:
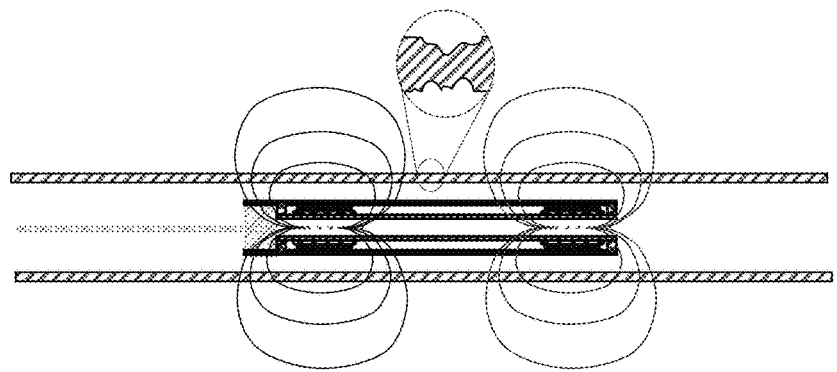
FIGS. 6A-6E illustrate other well features that could be detected by a casing collar locator of the invention.
Figure 6D:
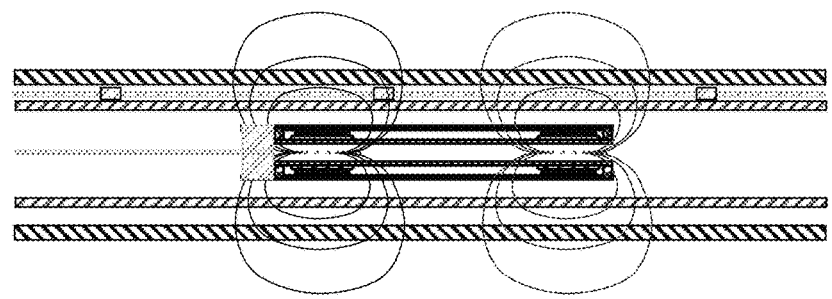
Figure 6C:
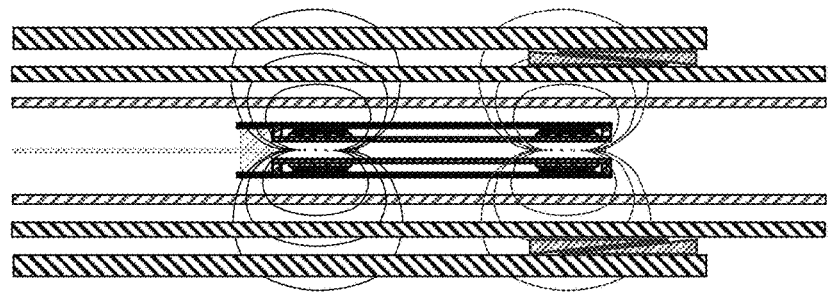
Figure 6B:
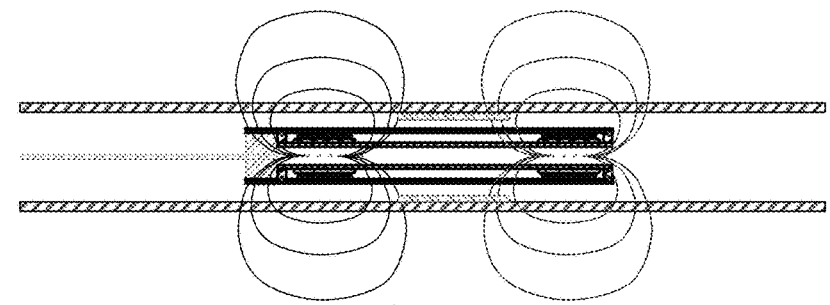
Figure 6A:
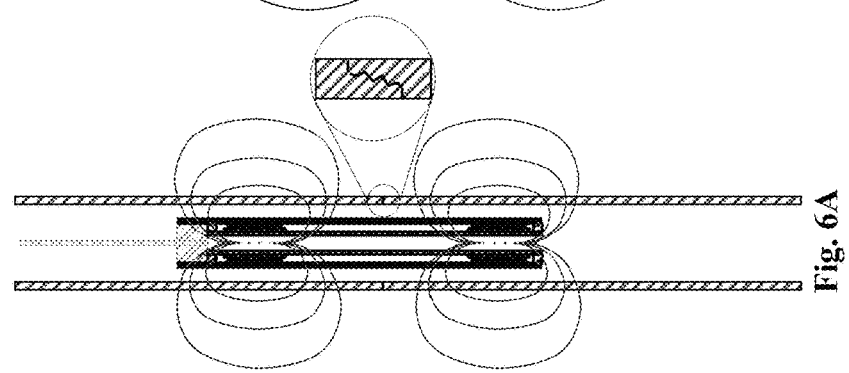

FIGS. 6A-6E demonstrates exemplary uses for casing collar locators of the present invention. FIG. 6A demonstrates the ability of devices of the present invention to detect casing joints, such as threaded joints, which do not employ casing collars. The joint may partly disrupt the conductivity and/or the magnetic permeability of the casing, registering as a conductive feature to casing collar locators of the present invention. The threaded casing joint may be detected as registering substantially the same change in voltage by casing collar locators of the present invention regardless of how the logging speed of the casing collar locator.

FIG. 6B demonstrates the ability of casing collar locators of the present invention to locate or detect internal patches, which may affect the conductivity of the casing. A patch may be constituted by a thin sheet wound and permanently glued at the inner face of a leaking damaged or pitted casing section. With accurate location and combined tool string utility, such patches may be more easily located, monitored, and maintained.

FIGS. 6C and 6D demonstrate the ability of casing collar locators of the present invention to detect other well features, such as a casing shoe or wire clamp. Because such conductive features would provide substantially consistent signals regardless of the speed at which the casing collar was moving, well features could be more accurately mapped, increasing tool string efficiency.

FIG. 6E demonstrates the ability of casing collar locators of the present invention to detect pitting, corrosion, or other disruptions in the continuity of the casing. Such physical features may affect the conductivity and magnetic permeability of the casing and thus may register as conductive features by the device. An operator skilled in the art may vary signal frequency, signal amplitude, and move the casing collar locator at slower speeds while producing consistent signals, to locate such features more accurately if they affect the electromagnetic fields of the inductor coils.

| Reference Table | |
|---|---|
| Reference Number | Component |
| 100 | Casing collar locator device |
| 101 | Signal generator |
| 102 | First inductor coil |
| 103 | First resistor |
| 104 | First potentiometer |
| 199 | Wireline |
| 202 | Second inductor coil |
| 203 | Second resistor |
| 204 | Second potentiometer |
| 301 | Differential amplifier |
| 302 | Inductor node |
| 303 | Resistor node |
| 304 | Potentiometer node |
| 305 | Low pass filter |
| 306 | Analog-to-digital converter |
| 401 | Ferrite core |
| 402 | Tool housing |
| 403 | Common stem |
| 900 | Well casing |
| 901 | Casing collar |

The invention claimed is:

1. A casing collar locator, comprising:
a first inductor coil;
a second inductor coil;
at least one signal generator; and
a bridge circuit comprising said first inductor coil, said second inductor coil, and a resistor branch comprising a first resistor and a second resistor, said bridge circuit arranged such that the at least one signal generator generates an alternating current through said first inductor coil that is of substantially equal amplitude and opposite phase to an alternating of current through said second inductor coil, wherein a test voltage measured at an inductor node connecting the first inductor coil and the second inductor coil is compared to a reference voltage measured on a resistor node of the resistor branch, such that comparing the test voltage and the reference voltage yields a signal indicative of the proximity of conductive or magnetic material to either the first inductor coil or second inductor coil.

2. The casing collar locator of claim 1, wherein the test voltage and reference voltage are used as input to a differential amplifier.

3. The casing collar locator of claim 1, wherein the at least one signal generator comprises a pulse-width modulated signal generator arranged for generating pseudo-sine waves of current in the first inductor coil and the second inductor coil.

4. The casing collar locator of claim 1, further comprising a low-pass filter.

5. The casing collar locator of claim 1, wherein the first inductor coil and the second inductor coil are located on a common stem.

6. The casing collar locator of claim 5, wherein said first inductor coil and the second inductor coil are each axially wound with respect to said common stem.

7. The casing collar locator of claim 1, wherein the at least one signal generator is arranged for generating a first wave signal at a 180-degree phase difference from a second wave signal, such that when the first wave signal is passed through the first inductor coil and the second wave signal is passed through the second inductor coil, the first inductor coil and second inductor coil generate substantially identical electromagnetic fields in the absence of proximal conductive or magnetic materials or absence of contrasts of conductive or magnetic materials.

8. The casing collar locator of claim 1, wherein the resistive branch comprises a first resistor, a second resistor, and one or more potentiometers.

9. The casing collar locator of claim 1, wherein said bridge circuit comprises
a first signal generator connected to said first inductor coil, a first resistor, and a first potentiometer;
a second signal generator connected to said second inductor coil, a second resistor, and a second potentiometer, wherein
said first inductor coil and said second inductor coil connect at an inductor node connected to a first input terminal of a differential amplifier,
said first and second resistors connect at a resistor node,
said first and second potentiometers connect at a potentiometer node,
said resistor node is connected to said potentiometer node, and
said potentiometer node is further connected to a second input terminal of said differential amplifier.

10. The casing collar locator of claim 1, further comprising a low pass filter connected to an output terminal from said differential amplifier, and an analog-to-digital converter connected to said low pass filter.

11. The casing collar locator of claim 1, wherein said first inductor coil and said second inductor coil each further comprise a ferrite core.

12. The casing collar of claim 1, wherein the resistor branch comprises at least one remotely adjustable variable resistor, such as a digital potentiometer.

13. The casing collar locator of claim 1, further comprising a non-conductive cylindrical tool housing.

14. The casing collar locator of claim 1, wherein the first inductor coil and the second inductor coil are closely matched such that an equal current through each inductor coil generates substantially identical electromagnetic fields.

15. The casing collar locator of claim 1, wherein the first inductor coil and second inductor coil are substantially identical.

16. A method of detecting materials having one or both of contrasts of conductivity and magnetic permeability of materials in or outside a borehole casing using the casing collar locator of claim 1, said method comprising
arranging said casing collar locator in a first axial position in said casing; and
measuring an amplitude and a phase of an output signal produced by the comparison of said test voltage to said reference voltage, said output signal being indicative of the proximity of said materials to the first inductor coil when the expected amplitude of signal through said first inductor coil is changed, said output signal being indicative of the proximity of conductive materials to the second inductor coil when the expected amplitude of signal through said second inductor coil is changed,
wherein the change of current through either the first inductor coil or the second inductor coil may be inferred from one or both of the amplitude and phase of the test voltage.

17. The method of claim 16, wherein a proximity of a conductive object to the first inductor coil produces an output of similar amplitude but opposite phase when the conductive object is at a similar proximity to the second inductor coil.

18. The method of claim 16 using the casing collar locator of claim 1, said method comprising
arranging said casing collar locator in a casing; and
measuring the amplitude and phase of output signal produced by the comparison of the test signal to the reference signal, the output signal being indicative of an imbalance in the electromagnetic induction of conductive materials surrounding the first inductor coil and the second inductor coil.

19. The method according to claim 16, wherein said casing collar locator is static.

* * * * *